(12) United States Patent
Dobschal et al.

(10) Patent No.: US 7,852,474 B2
(45) Date of Patent: Dec. 14, 2010

(54) SPECTRAL ANALYSIS UNIT WITH A DIFFRACTION GRATING

(75) Inventors: Hans-Juergen Dobschal, Kleinromstedt (DE); Ralf Wolleschensky, Jena (DE); Wolfgang Bathe, Jena (DE); Joerg Steinert, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 468 days.

(21) Appl. No.: 11/785,153

(22) Filed: Apr. 16, 2007

(65) Prior Publication Data

US 2007/0242268 A1  Oct. 18, 2007

(30) Foreign Application Priority Data

Apr. 15, 2006  (DE) .................. 10 2006 017 705

(51) Int. Cl.
*G01J 3/28* (2006.01)
(52) U.S. Cl. ...................................... 356/328
(58) Field of Classification Search .................. 356/328
See application file for complete search history.

(56) References Cited

U.S. PATENT DOCUMENTS

| | | | |
|---|---|---|---|
| 5,189,486 A | | 2/1993 | Florek et al. |
| 5,815,261 A | * | 9/1998 | Brooks et al. ............. 356/328 |
| 6,167,173 A | | 12/2000 | Schoeppe et al. |
| 7,009,699 B2 | | 3/2006 | Wolleschensky et al. |
| 2003/0151741 A1 | | 8/2003 | Wolleschensky et al. |
| 2005/0179895 A1 | * | 8/2005 | Puppels ...................... 356/328 |
| 2005/0248769 A1 | | 11/2005 | Weitzel |
| 2008/0112052 A1 | * | 5/2008 | Taira et al. ................. 359/569 |

FOREIGN PATENT DOCUMENTS

| | | |
|---|---|---|
| DE | 197 02 753 A1 | 7/1998 |
| DE | 10121499 A1 | 11/2002 |
| EP | 1 308 715 A | 5/2003 |
| WO | WO 00/62026 A | 10/2000 |

\* cited by examiner

*Primary Examiner*—Kara E Geisel
(74) *Attorney, Agent, or Firm*—Jacobson Holman PLLC

(57) ABSTRACT

A spectral analytical unit for acting on a parallel light bundle having different wavelengths. The spectral analytical unit includes a diffraction grating on which the light bundle falls, the diffraction grating splitting the different wavelengths through diffraction in first spectral directions defining a light bundle diffraction order 1 without recycle, and the diffraction grating bending the light bundle in second directions defining a light bundle diffraction order 0 without recycle, a detector line made up of a plurality of elements, optics for focusing the split light bundle diffraction order 1 without recycle on the detector line, evaluation electronics connected to the detector line for obtaining data related to a created spectrum, and a deflecting device wherein the diffraction order 0 light bundle without recycle meets on the deflecting device which is so directed and positioned that this light bundle falls on the diffraction grating thereby creating a reflected diffraction order 1 light bundle with first recycle and a reflected diffraction order 0 light bundle with first recycle whereby the diffraction order 1 without recycle and the reflected diffraction order 1 light bundle with first recycle each of a part wavelength range are impressed through the optics on a single element of the detector line.

11 Claims, 8 Drawing Sheets

FIG. 2
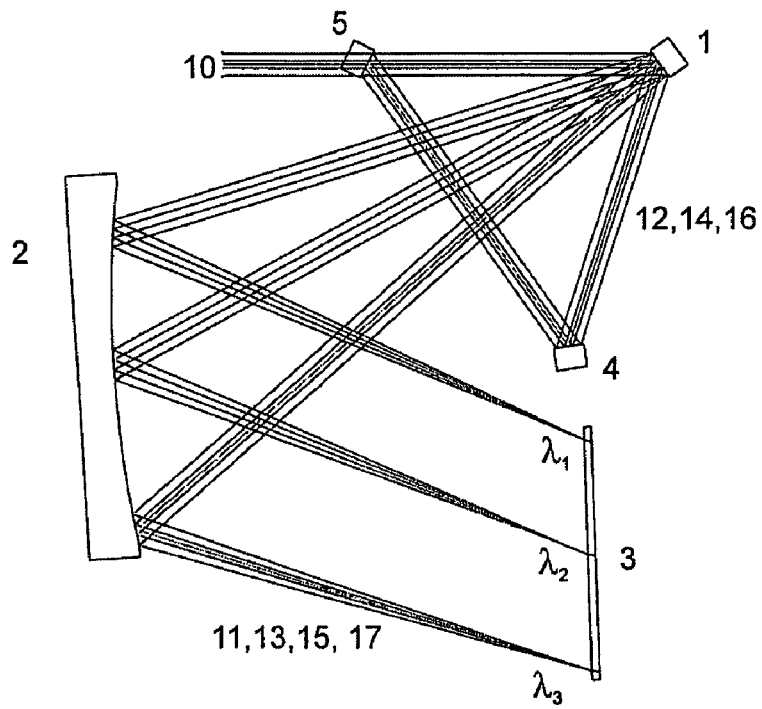
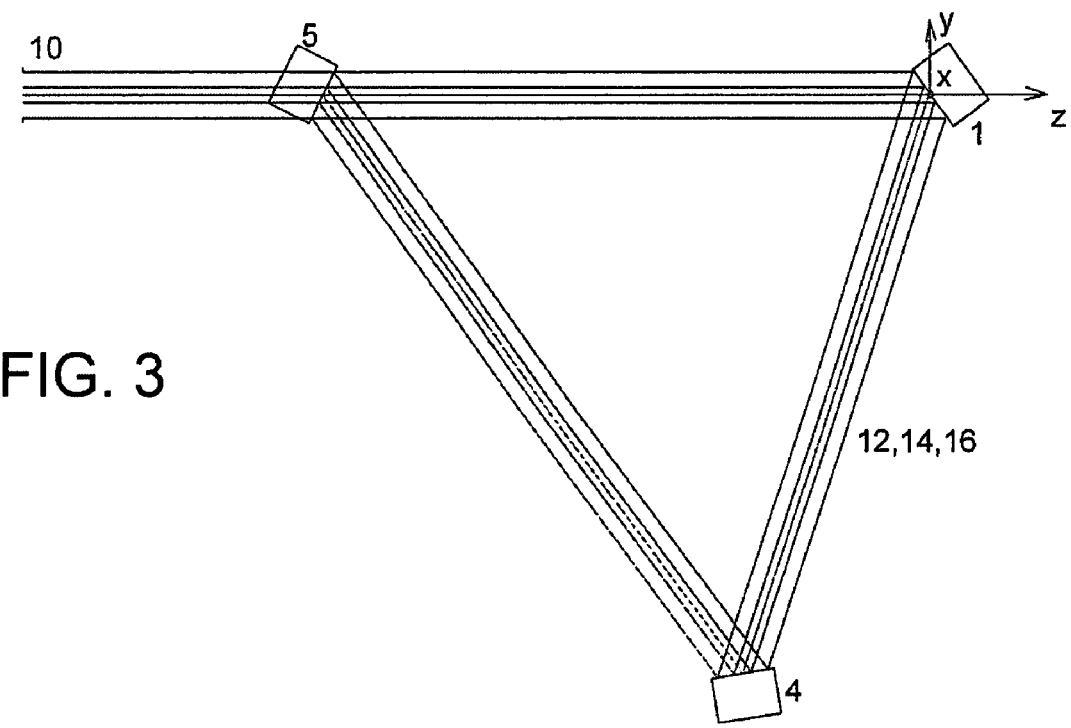
FIG. 3

SPECTRAL ANALYSIS UNIT WITH A DIFFRACTION GRATING

BACKGROUND OF THE INVENTION

1. Field of the Invention

The invention concerns a spectral analysis unit with a diffraction grating in which a parallel light bundle which has a wavelength range falls on a diffraction grating which splits the different wavelengths through diffraction in first spectral directions, wherein this light bundle is designated as an uncycled light bundle of a first order of diffraction ("uncycled first order light bundle"), and the diffraction grating bends the light bundle in a second direction, wherein this light bundle is designated as an uncycled light bundle of zero order of diffraction ("uncycled zero order light bundle"), furthermore parts of the wavelength range of the spectrally split uncycled first order light bundle can be focused on a detector line (3) through optics and evaluation electronics is connected to the detector line which receives and displays the created spectrum as data. The spectral unit finds application in all spectrometers. In particular the unit comes in use in a confocal Laser Scanning Microscope (LSM), such as the one described in DE 197 02 753 A1 or U.S. Pat. No. 7,009,699 B2, as measuring equipment for the spectrally split detection of fluorescence.

2. Related Art

The spectral unit with a diffraction grating is built in principle as a Spectrograph. A broad range light radiated from a sample is broken down spectrally through a dispersive element and then is measured by means of a detection unit and evaluated. In this way, a diffraction grating is set up as a dispersive element. Principally diffraction gratings are differentiated according to levels of flat grating with equidistant lines and a picturing grating which is preferably created holographically.

With the levels flat grating, collimation optics between the grating and the light source and a focusing optics between the grating and spectrum are necessary. These optics can be lenses or mirrors. Normally the spectrum of the first order of diffraction of the diffraction grating is created using the focusing optics on the receiver of the detection unit. The problem is that the diffraction efficiency of the diffraction grating changes very markedly depending on the wavelength, the grating constants, the grating material and the profile form i.e., the complete transmission has strong limitations because of physical conditions.

In particular with small grating constants (g) further polarization effects appear if g is of the order of magnitude of the wave length or is smaller. The polarization effects show themselves in a strong split according to the intensity of the TE and TM polarization, by which the diffraction intensity is strongly reduced at least in the border ranges of the spectrum.

With a mechanically created blazed grating it is common to determine the blaze angle of grating grooves such that for a certain desired wavelength, highest possible diffraction efficiency is reached or a compromise for the fall in diffraction efficiency is created. The bigger the spectral range, the bigger the fall.

A known method for getting around this problem is shown by the use of Echelle systems such as is described in U.S. Pat. No. 5,189,486. Here a flat grating is used in very high diffraction orders whereby at first short overlapping spectral areas come up all of which work in the neighborhood of the blaze angle. For lateral separation of the spectrum a prism is added in the system which works perpendicularly to the dispersion direction of the grating. Through this one gets many lateral overlapping order lines. However the condition for the use of this process is the use of a surface receiver.

The reason for the spectral variation of the efficiency of diffraction lies in that the electromagnetic behavior of the grating diffracts one more or less big part of the light in other than the desired first order of diffraction, through which it is lost and even further creates scattered light problems. In particular the biggest part of the energy in the zero order of diffraction gets lost, particularly then when no further bigger first orders of diffraction or no smaller zero order of diffraction can appear physically.

The invention is intended to solve the task to increase significantly the diffraction efficiency of a spectral analysis unit with a grating with small expense.

BRIEF SUMMARY OF THE INVENTION

The present invention is based on the fact that the zero order of diffraction arising from diffraction on a grating does not get "lost" energetically as for example happens through gating or absorption, but to let it couple in the spectral unit again and to diffract at least still one more time. Thus after this repeated execution there arise a part of a first order of diffraction and again a certain remaining portion of a zero order of diffraction. This will however be coupled back and will be diffracted again. Theoretically this loop can be executed "without end" and the reached diffraction efficiency converges to the sum from the original zero order of diffraction and first order of diffraction for the corresponding color. For the case that only the zero order of diffraction and the first order of diffraction exist, one will reach ideal diffraction efficiency up to loss due to absorption over the full spectral range.

This process will be limited only through the maximum possible size of the diffraction grating, the mirror and focusing optics. In particular with moderate bundle diameters one can realize a relatively high number of cycles. The advantage of this arrangement is further that it can be relatively easily integrated retroactively in the existing Spectrograph constructions.

BRIEF DESCRIPTION OF THE DRAWINGS

FIG. 2 is a schematic diagram of a display arrangement according to FIG. 1 in the dispersion plane of the diffraction grating.

FIG. 3 is a schematic diagram of a section from FIG. 2 for displaying of the position of the deflecting mirror.

DETAILED DESCRIPTION OF THE INVENTION

Figure 1:
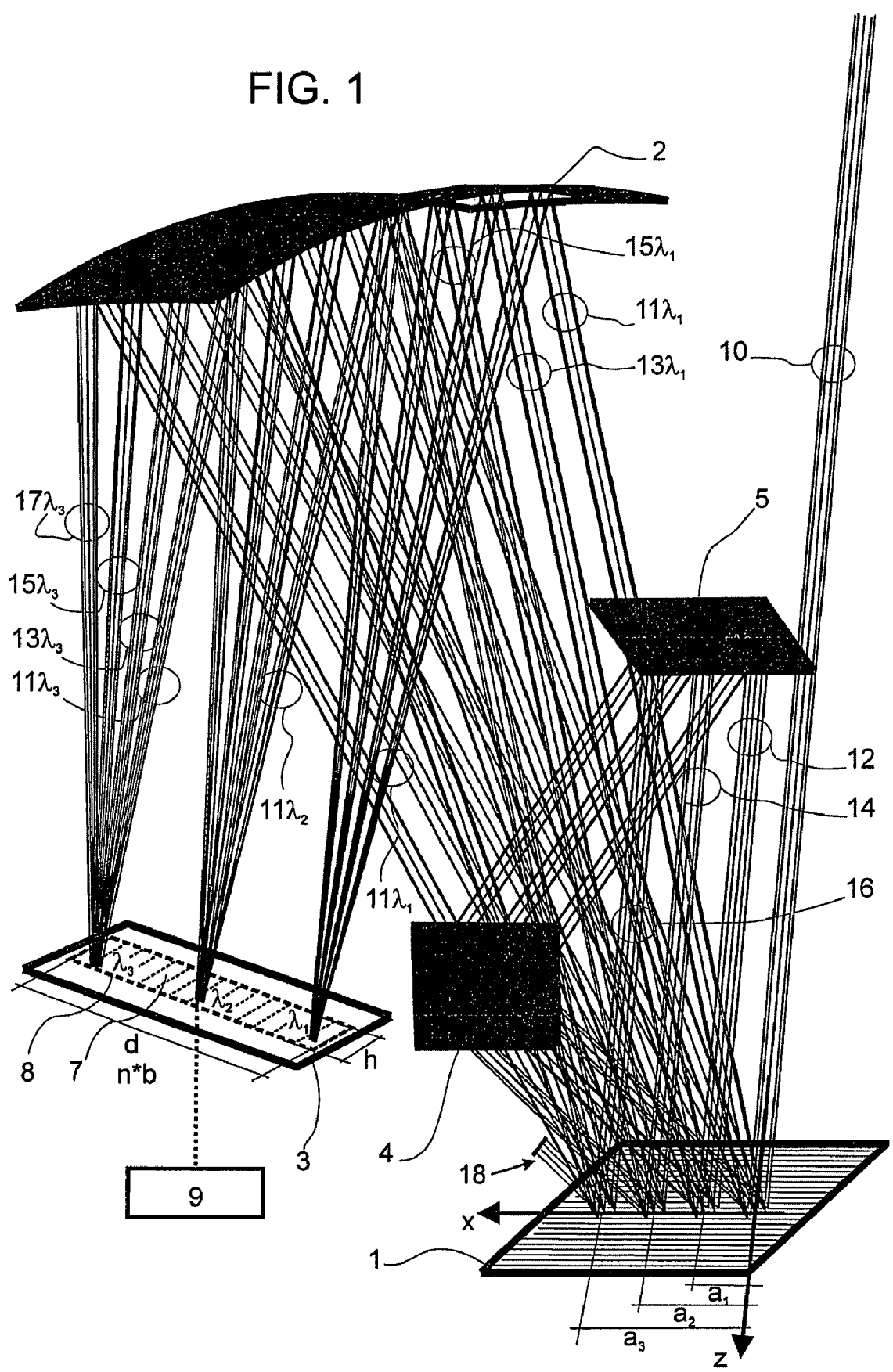
FIG. 1 is a schematic diagram of a spectral analysis unit with a diffraction grating, two deflecting mirrors and one focusing mirror.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows schematically the construction of the Spectral Analysis Unit with one diffraction grating and two deflecting mirrors.

An incident, mainly parallel light bundle 10, falls on a diffraction grating 1. This will be diffracted spectrally by appropriate dimensioning of the diffraction grating 1 in a first order light bundle 11 and split in a zero order light bundle 12. The light bundle 11 of a first order of diffraction falls on a focusing mirror as optics 2 and is concentrated on a detector line 8 of a line receiver 3 along the expansion direction of the line. The detector line consists of individual CCD elements 7. In the expansion direction of the line the spectral split of the first order light bundle is detected.

To the diffraction grating 1 a first deflecting mirror 4 is so arranged that it reflects the zero order light bundle 12 in the direction of incident light bundle 10. At a location which is as close as possible to the incident light 10 a second deflecting mirror 5 is so positioned that it deflects the zero order light bundle parallel to the incident light bundle 10 again on the diffraction grating 1. In this, the place illuminated on the diffraction grating 1 from the zero order of diffraction is shifted by the amount a1 from the place of the incident light bundle 10 in the X direction. The zero order light bundle 12 is diffracted there under the same conditions as the incident light bundle 10. The zero order of diffraction 14 arising again here is vertically offset again, is coupled in through the two deflecting mirrors 4 and 5 and reaches the grating at a distance of a2. A further cycling of the zero order light bundle 16 reaches the grating at the distance of a3. In general it is already sufficient, three such cycles, realized here with the zero order light bundles 12, 14 and 16, to achieve a significant increase in efficiency. In the example the zero order light bundle from the third cycle 18 is not used because it is negligible.

All the same wavelengths of the first order light bundle 11, 13, 15 and 17 are formed each in a corresponding point on the detector line 8 through the optics 2 so that one line on the detector line 8 reproduces the spectral characteristic. The first order light bundle which can be assigned to one wavelength, for example the wavelengths λ1, λ2 and λ3 are shown, each meet at one place on the detector line 8. Because the detector line 8 is made in the end from large single elements 7, a wavelength range of about 10 nm is received the width b of the single element 7 of slightly less than 1 mm. In this example 32 individual receivers 7 are arranged on the detector line 8 which is 32 mm wide. The individual receivers have a height h of 10 mm. The measured wavelength range lies between 380 nm and 780 nm.

So that the process works optimally, the profile design of the diffraction grating 1 must be so made that as far as possible only the zero order of diffraction occurs as false light order. This can be achieved by the maximum blaze of the grating being shifted in the short wave range. With mechanical triangular profiles this would mean that the groove angle is flatter. For example with a diffraction grating which at 500 nm diffracts 70% in a first order of diffraction and the remaining 30% in the zero order of diffraction, the following behavior appears:

Intensity after 1st cycle=70% (starting status) (30% remains in the zero order of diffraction)
Intensity after 2nd cycle=70%+70%×30%=91% (9% remains in the zero order of diffraction)
Intensity after 3rd cycle=91%+70%×9%=97.3% (2.7% remains in the zero order of diffraction).

With this example calculation the absorption losses are not taken into consideration because these are negligible.

FIG. 2 is a representation of the arrangement according to FIG. 1 in a representation in which the incident light bundle 10 and the diffracted first order light bundles 11, 13, 15, 17 are in the plane of the paper. The zero diffraction order light bundles 12, 14 and 16 are directed through the first deflecting mirror 4 below the incident light bundle 10. The second deflecting mirror 5 directs this zero order diffraction light bundle parallel to the first order light bundle back to the first diffraction grating.

FIG. 3 shows a section from the FIG. 2 drawing to illustrate the position of the axes of the reference system. The coordinate origin is located in the apex of the diffraction grating 1, the positive z axis pointing in the direction of the extended incident light bundle 10. The order of the translation and tilting of the components is as follows:

To implement the translation in the x, y, z directions
Rotation around the corresponding surface particular X axis (alpha angle)
Rotation around the corresponding surface particular Y axis (beta angle)
Rotation around the corresponding surface particular Z axis (gamma angle)

| Construction Element | X | Y | Z | alpha | beta | gamma |
|---|---|---|---|---|---|---|
| Origin | 0.0 | 0.0 | 0.0 | 0.0 | 0.0 | 0.0 |
| Diffraction grating 1 (line grating) | 0.0 | 0.0 | 0.0 | 36.0 | 0.0 | 0.0 |
| Deflecting mirror 4 (plane mirror) | 0.0 | −38.04226 | −12.36068 | 99.0 | −3.4006 | 0 |
| Deflecting mirror 5 (plane mirror) | 5.00273 | 0.03365 | −40.14952 | 153.1634 | −3.3957 | 4.1346 |
| Optics 2 (focusing mirror) | 1.08218 | −40.56915 | −74.59381 | −176.3830 | 0.6787 | 5.1892 |
| Line receiver 3 (CCD line) | −0.82344 | −65.81362 | −8.70134 | −178.0008 | 0.5315 | 5.2063 |

The invention makes it possible to detect a spectral range from 380 nm-700 nm. In this the length of the spectrum is 31.2 mm. The diameter of the incident light bundle 10 is 3.0 mm and the grating density is ascertained at 1300 lines/mm.

The offset of the 0 diffraction order light bundle in X direction comes to 5.00 mm per cycle. The first deflecting mirror 4 and the second deflecting mirror 5 are plane mirrors, the optics 2 is a mirror with a radius of 151.0 mm (cc).

Figure 4:
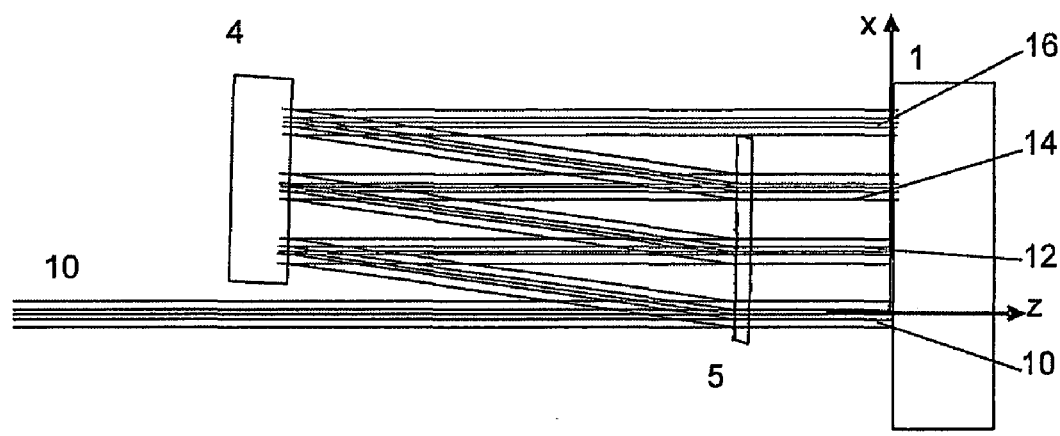
FIG. 4 is a schematic diagram of a side view of an arrangement according to FIG. 1.

FIG. 4 shows a further view of the arrangement shown in FIG. 1 in the X-Z plane. The diagram plane lies perpendicular to the dispersion plane. The zero order light bundles 12, 14, 16 fall on the diffraction grating 1 shifted in the X direction to different places.

Figure 5:
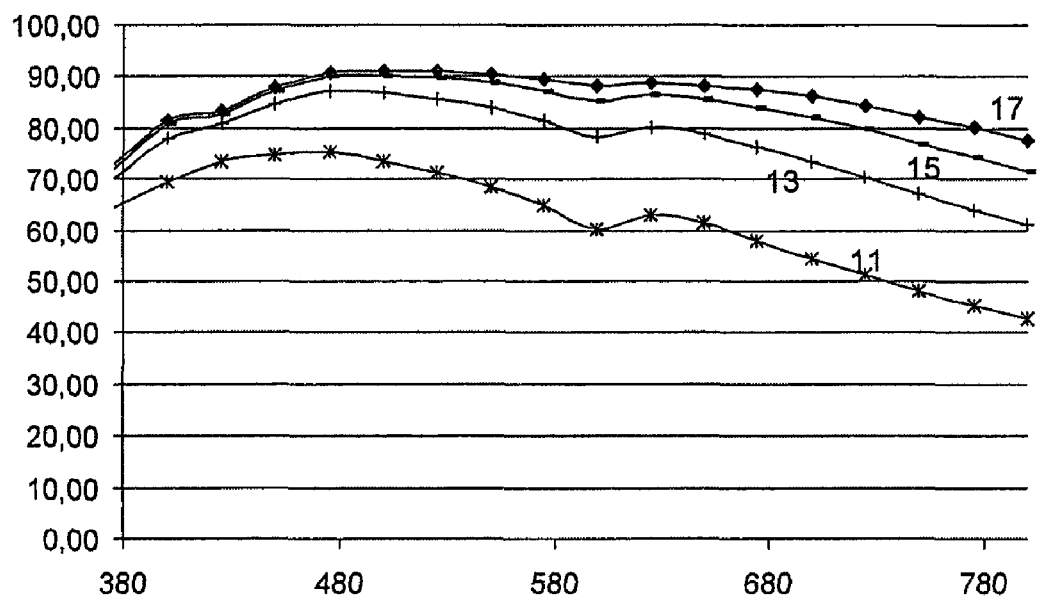
FIG. 5 is a graphic representation showing the efficiency of the arrangement according to the invention with back coupling of the zero order of diffraction.

FIG. 5 shows the diffraction efficiency as a function of the wavelength for a known simple arrangement with a line grating with 1302 lines in Aluminum. The first order light bundle 11, which is created from an incident light bundle, reaches in the spectral region about 530 nm its maximum intensity at nearly 80% and falls steadily on both sides up to nearly 40%. The corresponding curve is identified in the graph as 11.

Further the Figure shows that with an increasing number of back couplings of the 0 diffraction order light bundle an increasing efficiency increase is achieved. To the intensity of the first order light bundle 11 from the incident light bundle are added the intensities of the first order light bundle 13 from the first cycle as well as the intensities of light bundle 15 and 17 from further cycles. The corresponding resulting curves are identified in the graph as 11, 13, 15 and 17.

Figure 6:
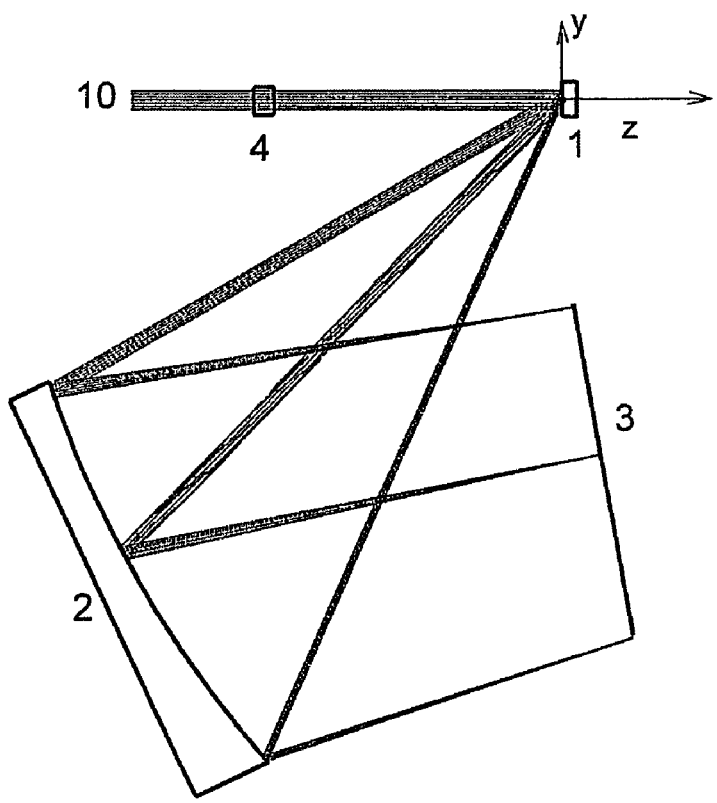
FIG. 6 is a schematic diagram of the spectral analysis unit with a diffraction grating and one deflecting mirror.

FIG. 6 shows schematically a Spectral Analysis Unit with one diffraction grating and one single deflecting mirror. The incident light bundle 10 falls here slightly tilted around the y axis on the diffraction grating 1 whereby the diffraction grating 1 and the deflecting mirror 4 stand preferably parallel to each other. Here the zero order light bundles are reflected back on the diffraction grating 1 with the deflecting mirror 4 under the plane of the diagram.

Figure 7:
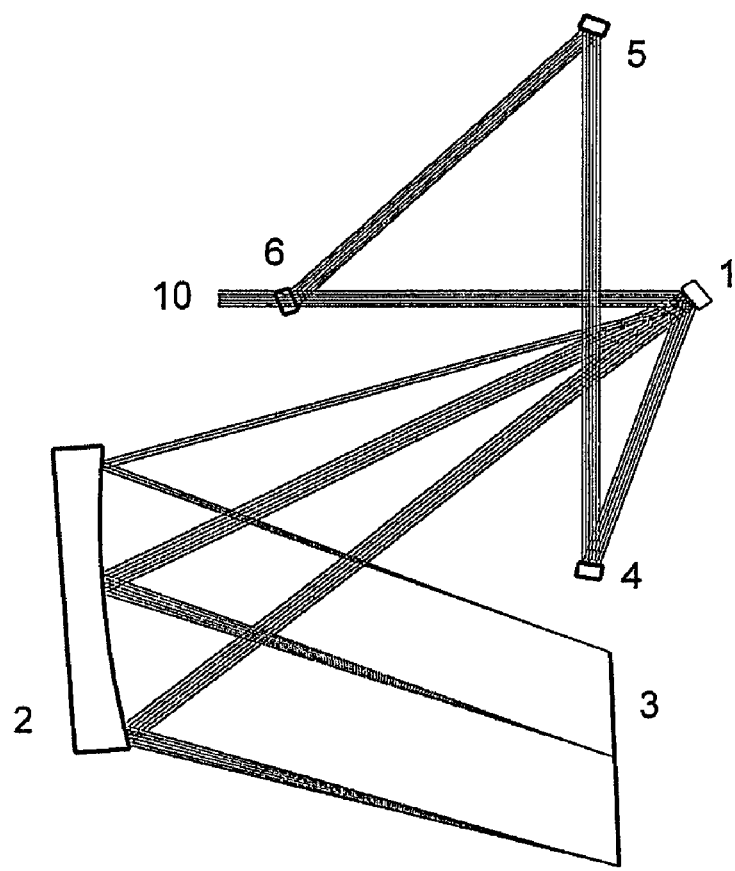
FIG. 7 is a schematic diagram of the spectral analysis unit with one diffraction grating and three deflecting mirrors.

FIG. 7 shows schematically a Spectral Analysis Unit with one diffraction grating and three deflecting mirrors 4, 5 and 6. But more than three mirrors can also be used.

Figure 8:
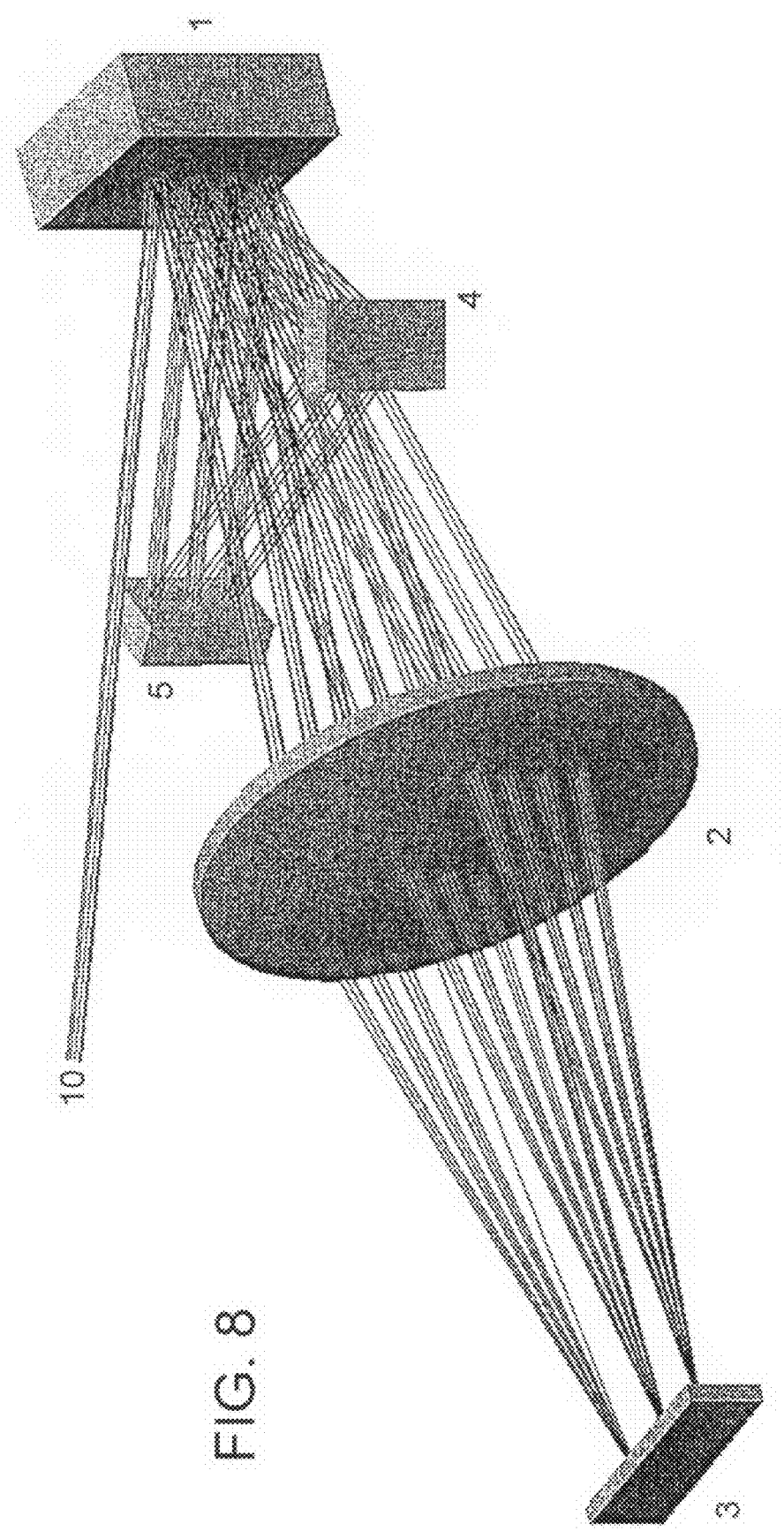
FIG. 8 is a schematic diagram of the spectral analysis unit with one diffraction grating, two deflecting mirrors and one collecting lens

FIG. 8 shows a Spectral Analysis Unit corresponding to FIG. 1 with one diffraction grating 1, two deflecting mirrors 4, 5, one collecting lens as optic 2 and line receiver 3.

Figure 9:
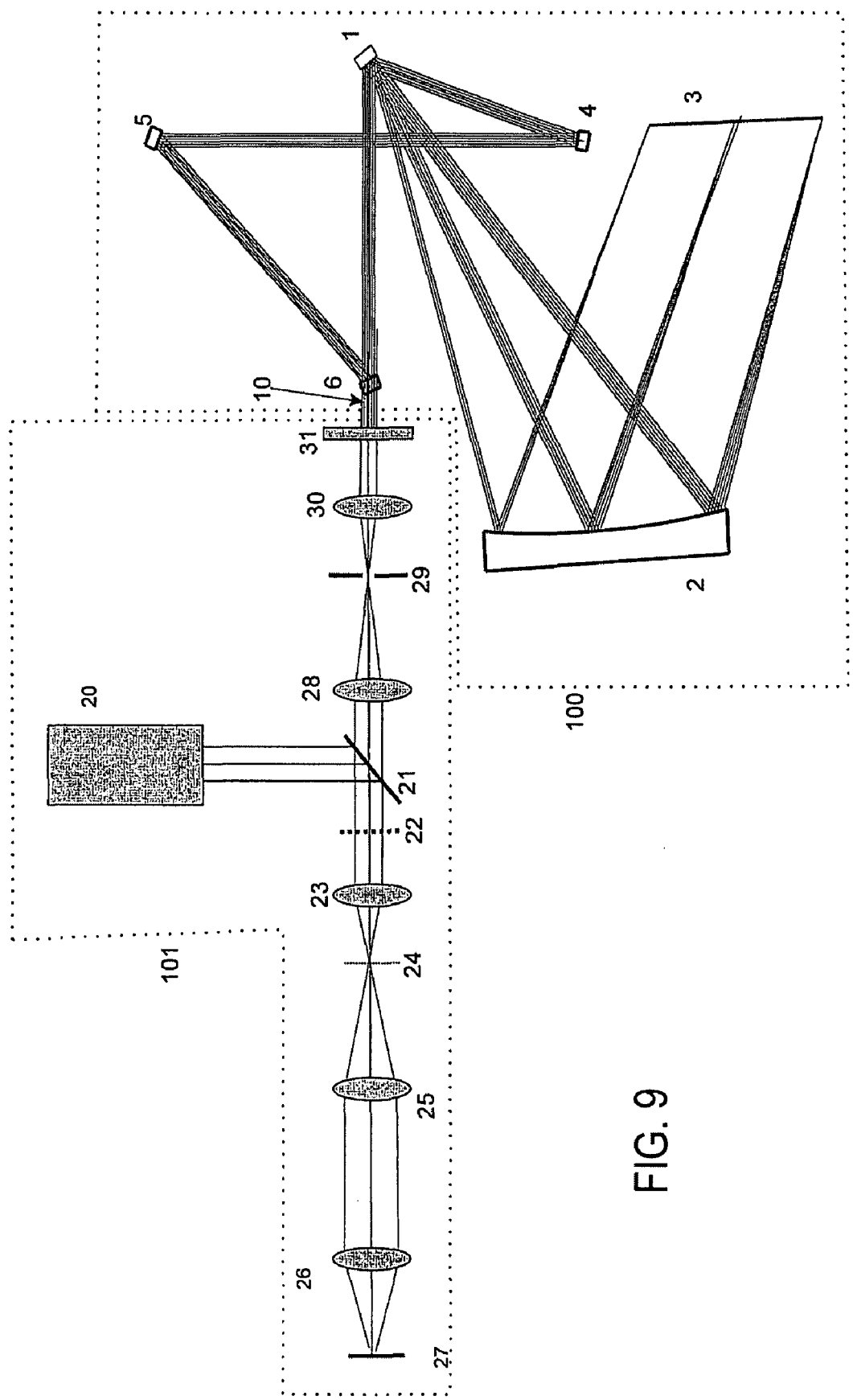
FIG. 9 is schematic diagram of the construction of a confocal Laser Scanning Microscope with the spectral analysis unit according to the invention as a measuring device.

FIG. 9 shows the schematic construction of a confocal Laser Scanning Microscope 101 with the spectral analysis unit 100 as measuring device. The spectral analysis unit 100 corresponds in its construction to the arrangement shown in FIG. 7. The radiation bundle going out from the light source 20 reaches through a main color splitter 21, an x-y scanner 22, a scan optics 23, a tubular lens 25 and a lens 26 to the sample 27.

The light bundle going out from the sample 27 reaches through the lens 26, the tubular lens 25, the scan optics 23, the x-y scanner 22, the main color splitter 21 as well as a pinhole optics 28, a pinhole 29, a collimator optics 30 and an emission filter 31 to the diffraction grating 1.

Between the scan optics 23 and the tubular lens 25 arises an intermediate image 24. With the Spectral Analysis Unit according to the invention an increase of up to more than 40% in the light yield with a spectral measurement is achieved with comparatively smaller expense. Thereby the space requirement for the additional deflecting facility and the additional radiation flow is small. Particularly advantageous is also that the invention can be built in already available Laser Scanning Microscopes and other spectrometric devices.

Figure 10:
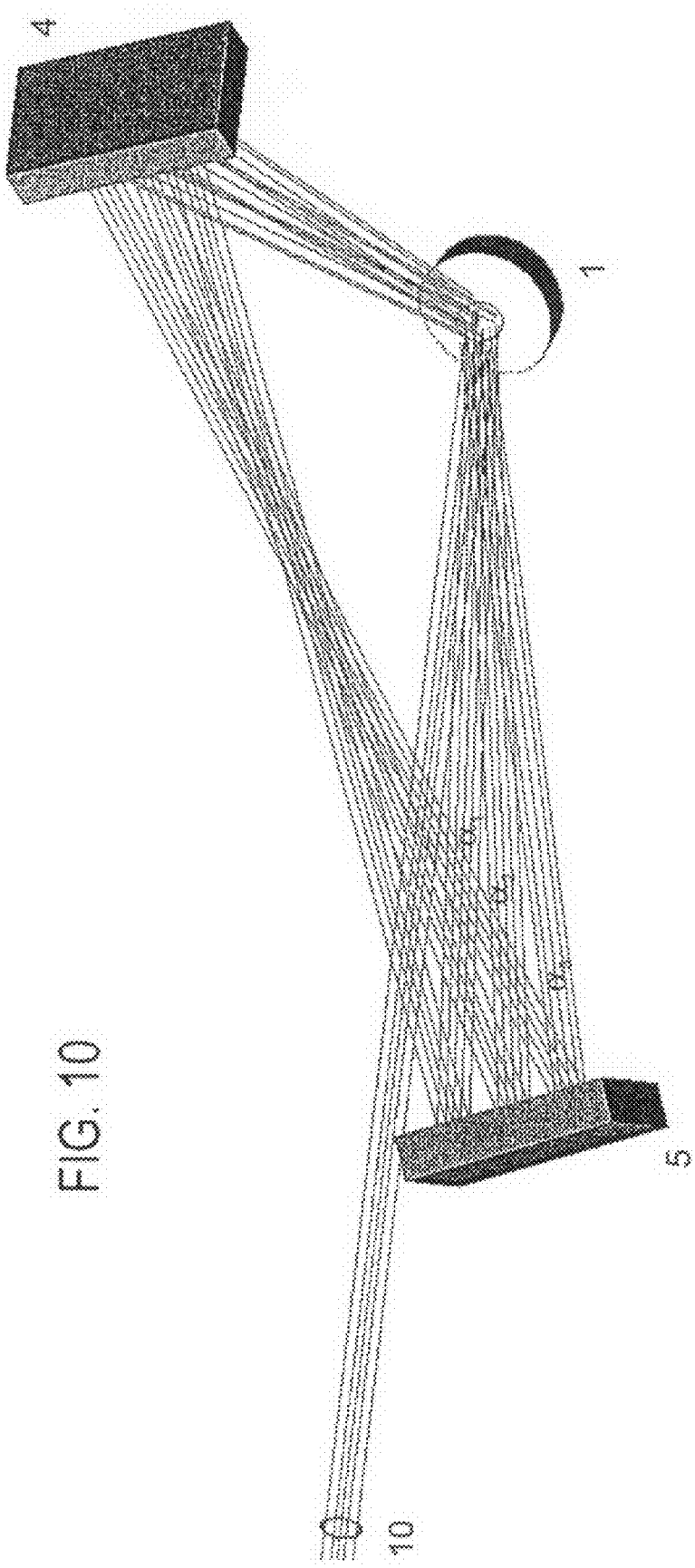
FIG. 10 is a schematic diagram showing a further variation of the spectral analysis unit with one diffraction grating, with two deflecting mirrors.

According to FIG. 10, it is also possible to rotate the second deflecting mirror 5 in such a way that the zero order light bundles 12, 14, 16 meet the diffraction grating 1 at the same place after each cycle. However in this case an offplane angle is formed perpendicular to the direction of dispersion of the grating, whereby the spectral focal points arise for the individual cycles in different lateral heights h on the line receiver 3. With a sufficiently large receiver height h, partial wavelength ranges of all spectrally split first order light bundles 11, 13, 15, 17 from the different cycles are caught by each individual element 7.

Figure 11:
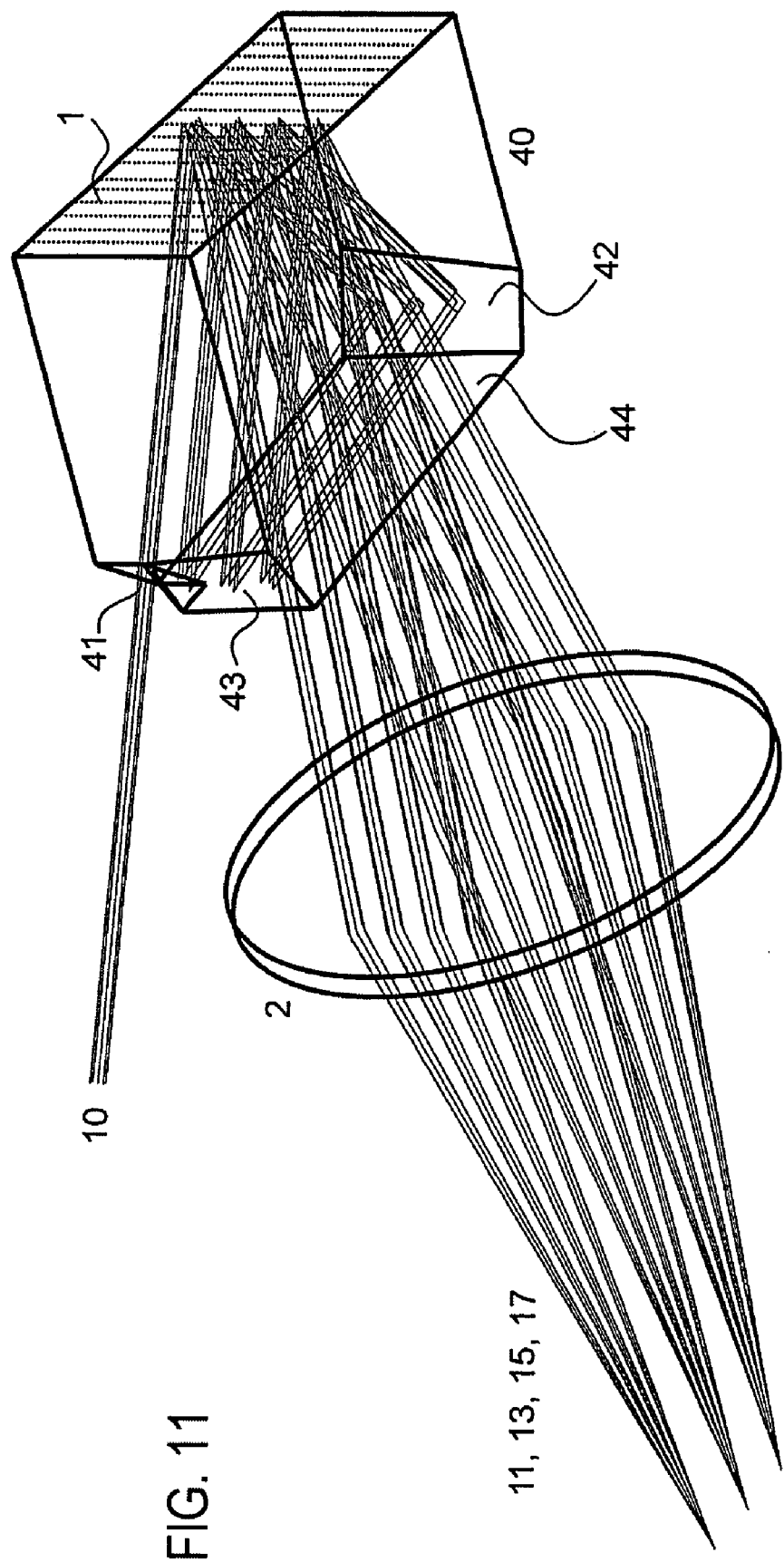
FIG. 11 is a schematic diagram of a spectral analysis unit in which the diffraction grating and the deflecting mirror form a monolithic unit.

FIG. 11 shows a Spectral Analysis Unit, with which the diffraction grating 1 and the deflection device form a unit. A prism base (prism section 40) contains a light entry surface 41 for the incident light bundle 10 and a light exit surface 44 for the first order light bundles 11, 13, 15, 17. Two side walls 42 and 43 are mirrored and form a deflecting device with the sealing surfaces 41 and 42. The diffraction grating 1 is placed in a base of the prism section 40.

REFERENCE DIAGRAM LIST

| No. | Description |
|---|---|
| 1 | Diffraction grating 1 (line grating) |
| 2 | Optics (focusing mirror, lens) |
| 3 | Line receiver (sensor elements of a CCD) |
| 4 | First deflecting mirror (flat mirror) |
| 5 | Second deflecting mirror (flat mirror) |
| 6 | Third deflecting mirror (flat mirror) |
| 7 | Individual element |
| 8 | Detector line |
| 9 | Evaluation electronics |
| 10 | Incident light bundle (parallel) |
| 11 | Light bundle - uncycled first order of diffraction (from the incident light bundle) |
| 12 | Light bundle - uncycled zero order of diffraction (from the incident light bundle) |
| 13 | Light bundle - first order of diffraction from the first cycle |
| 14 | Light bundle - zero order of diffraction from the first cycle |
| 15 | Light bundle - first order of diffraction from the second cycle |
| 16 | Light bundle - zero order of diffraction from the second cycle |
| 17 | Light bundle - first order of diffraction from the third cycle |
| 18 | Light bundle - zero order of diffraction from the third cycle is negligible |
| 19 | |
| 20 | Light source |
| 21 | Main color splitter |
| 22 | X-Y scanner |
| 23 | Scan optics |
| 24 | Intermediate image |

TUBULAR LENS

| | |
|---|---|
| 25 | Lens |
| 26 | Sample |
| 27 | Pinhole optics |
| 28 | Pinhole |
| 30 | Collimator optics |
| 31 | Emission filter |
| 40 | Prism section |
| 41 | Light entry surface |
| 42 | Mirror surface |
| 43 | Mirror surface |
| 44 | Light exit surface |
| 100 | Spectral Analysis Unit |
| 101 | Confocal Laser Scanning Microscope |
| a | Distance of zero order light bundle from the incident light bundle |
| α | Angle of zero order of diffraction relative to the incident light bundle |
| h | Height of the individual receivers, height of the detector line |
| b | Width of the individual receiver |
| d | Width of the detector line |
| n | Number of individual receivers |

It is to be understood that the present invention is not limited to the illustrated embodiments described herein. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. A spectral analysis unit for acting on a parallel light bundle having a range of wavelengths, the spectral analysis unit comprising:

a diffraction grating configured to spectrally split through diffraction the different wavelengths of an incident parallel light bundle having a range of wavelengths into an uncycled first order light bundle in a first direction, and into an uncycled zero order light bundle in a second direction, a detector line made up of a plurality of individual elements, a deflecting device oriented and positioned to reflect the uncycled zero order light bundle back to the diffraction grating to spectrally split through diffraction the different wavelengths of the reflected zero order light bundle into a first cycle first order light bundle in the first direction, and into a first cycle zero order light bundle in the second direction, wherein the deflecting device comprises a prism section which has a minimum of first, second, third, and fourth optically effective surfaces perpendicular to a dispersion plane of the diffraction grating, wherein the first optically effective surface constitutes a light entry surface for the incident parallel light bundle and lies opposite to the diffraction grating, the second optically effective surface constitutes a light exit surface for the first order light bundles and the third optically effective surface constitutes a first mirroring surface for reflection of the zero order light bundles, wherein the diffraction grating constitutes another surface of the prism, first optic means for focusing the same parts of the wavelength range of the uncycled first order light bundle and the first cycle first order light bundle onto respective individual elements of the detector line, and evaluation electronics connected to the detector line for obtaining data related to a created spectrum.

2. The spectral analysis unit according to claim 1, wherein the fourth optically effective surface constitutes a second mirroring surface for reflection of the zero order light bundles.

3. A spectral analysis unit for acting on a parallel light bundle having a range of wavelengths, the spectral analysis unit comprising:

a diffraction grating configured to spectrally split through diffraction the different wavelengths of an incident parallel light bundle having a range of wavelengths into an uncycled first order light bundle in a first direction, and into an uncycled zero order light bundle in a second direction, a detector line made up of a plurality of individual elements, a deflecting device oriented and positioned to reflect the uncycled zero order light bundle back to the diffraction grating to spectrally split through diffraction the different wavelengths of the reflected zero order light bundle into a first cycle first order light bundle in the first direction, and into a first cycle zero order light bundle in the second direction, wherein the deflecting device is oriented and positioned so that the reflected zero order light bundle is incident on the diffraction grating parallel to the incident light bundle and offset in the X direction with respect to the incident light bundle, first optic means for focusing the same parts of the wavelength range of the uncycled first order light bundle and the first cycle first order light bundle onto respective individual elements of the detector line, and evaluation electronics connected to the detector line for obtaining data related to a created spectrum.

4. A spectral analysis unit for acting on a parallel light bundle having a range of wavelengths, the spectral analysis unit comprising:

a diffraction grating configured to spectrally split through diffraction the different wavelengths of an incident parallel light bundle having a range of wavelengths into an uncycled first order light bundle in a first direction, and into an uncycled zero order light bundle in a second direction, a detector line made up of a plurality of individual elements, a deflecting device oriented and positioned to reflect the uncycled zero order light bundle back to the diffraction grating to spectrally split through diffraction the different wavelengths of the reflected zero order light bundle into a first cycle first order light bundle in the first direction, and into a first cycle zero order light bundle in the second direction, first optic means for focusing the same parts of the wavelength range of the uncycled first order light bundle and the first cycle first order light bundle onto respective individual elements of the detector line, and evaluation electronics connected to the detector line for obtaining data related to a created spectrum, the deflecting device is oriented and positioned to reflect the first cycle zero order light bundle back to the diffraction grating to spectrally split through diffraction the first cycle zero order light bundle into a second cycle first order light bundle and a second cycle zero order light bundle, and the first optic means focuses the same parts of the wavelength range of the uncycled first order light bundle, the first cycle first order light bundle, and the second cycle first order light bundle onto respective individual elements of the detector line.

5. The spectral analysis unit according to claim 4, wherein the deflecting device reflects back to the diffraction grating the second cycle zero order light bundle and the zero order light bundle from at least one additional cycle of spectral splitting by the diffraction grating, for spectral splitting by the diffraction grating.

6. The spectral analysis unit according to claim 5, wherein the reflected zero order light bundles strike the diffraction grating at the same angle as the incident light bundle, and the reflected zero order light bundles are offset a distance ($a_1$, $a_2$, $a_3$) in the X direction to the incident light bundle.

7. The spectral analytic unit according to claim 5, wherein the deflecting device is oriented and positioned in such a way that the reflected zero order light bundles strike the diffraction grating at a different angle ($\alpha_1$, $\alpha_2$, $\alpha_3$), but at the same place as the incident light bundle, so that all first order light bundles of a partial wavelength range can be imaged onto a line detector in a direction perpendicular to the width (d) of the detector line, wherein the height (h) of the individual elements of the detector line is such that all first order light bundles of the partial wavelength range are detectable.

8. The spectral analytic unit according to claim 4, wherein the deflecting device comprises a first deflecting mirror and a second deflecting mirror, which together reflect the zero order light bundles diffracted by the diffraction grating, back to the diffraction grating after two reflections.

9. The spectral analysis unit with a diffraction grating according to claim 4, wherein the deflecting device comprises a combination of at least first and second deflecting mirrors.

10. The spectral analysis unit according to claim 4, wherein the first optic means comprises a focusing mirror.

11. The spectral analysis unit according to claim 4, wherein the first optic means comprises a light bundling lens.

* * * * *